United States Patent [19]

Kumar

[11] Patent Number: 4,565,686
[45] Date of Patent: Jan. 21, 1986

[54] METHOD OF STORING HYDROGEN USING NONEQUILIBRIUM MATERIALS AND SYSTEM

[75] Inventor: Kaplesh Kumar, Wellesley, Mass.

[73] Assignee: The Charles Stark Draper Laboratory, Inc., Cambridge, Mass.

[21] Appl. No.: 502,535

[22] Filed: Jun. 13, 1983

Related U.S. Application Data

[63] Continuation of Ser. No. 226,927, Jan. 21, 1981, abandoned.

[51] Int. Cl.$^4$ ................................................ C01B 6/24
[52] U.S. Cl. .................................. 423/644; 148/403; 420/435; 420/455; 420/900; 422/129; 422/139; 423/648 R
[58] Field of Search ................. 420/435, 455, 900; 148/403; 422/129, 139; 423/644, 648 R, 645

[56] References Cited

U.S. PATENT DOCUMENTS

| | | | |
|---|---|---|---|
| 4,116,682 | 9/1978 | Polk et al. | 75/170 |
| 4,242,315 | 12/1980 | Bruning et al. | 423/645 |

Primary Examiner—R. Dean
Attorney, Agent, or Firm—Weingarten, Schurgin Gagnebin & Hayes

[57] ABSTRACT

A nonequilibrium state material, typically a rare-earth-transition metal, for reversible hydrogen storage. A rare earth-transition metal such as a rare earth cobalt alloy, like a samarium-cobalt or a lanthanum-nickel alloy, is provided in the amorphous or metastable crystalline state as a hydrogen absorbing material, particularly for use in a hydrogen storage and retrieval system, such as a fluidized bed or stacked plate hydrogen storage cell. The rare-earth-transition metal material is rapidly cooled from the liquid state to avoid the transition to a full crystalline state thereby obtaining an amorphous or quasi-stable crystalline state material which has the property of enhanced hydrogen storage capacity as well as being substantially immune to fracturing.

8 Claims, 4 Drawing Figures

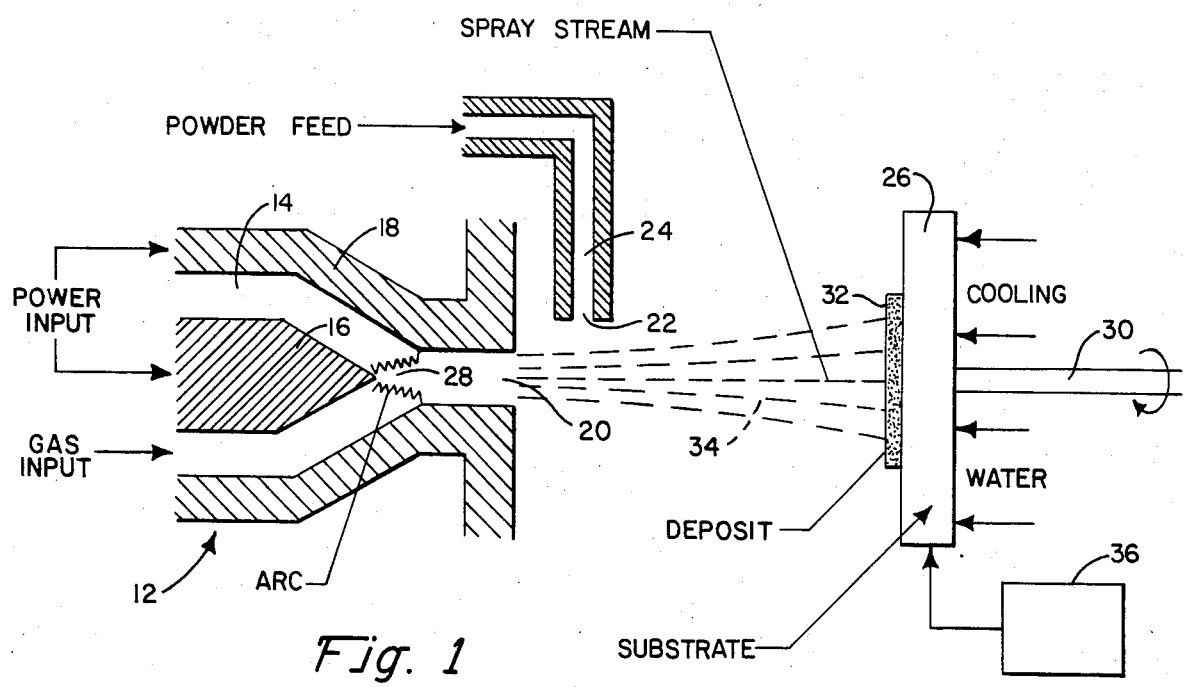
Fig. 1
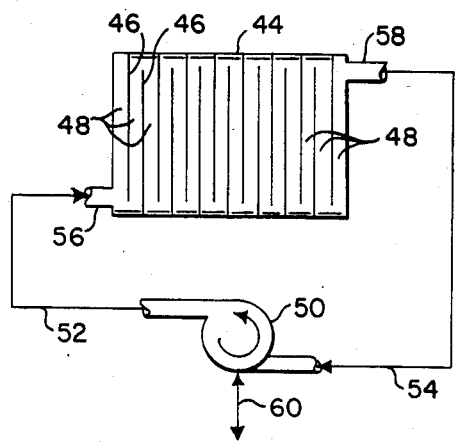
Fig. 3
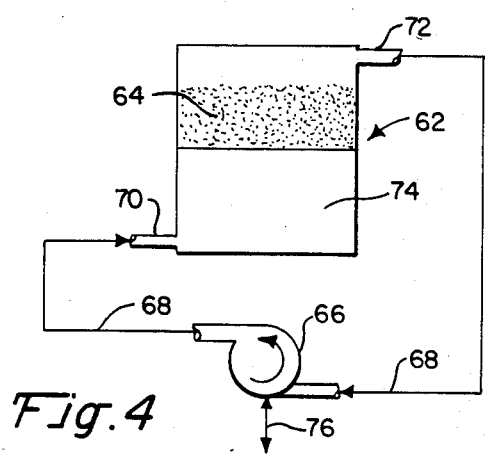
Fig. 4
Fig. 2

METHOD OF STORING HYDROGEN USING NONEQUILIBRIUM MATERIALS AND SYSTEM

This application is a continuation of application Ser. No. 226,927, filed on Jan. 21, 1981, abandoned.

FIELD OF THE INVENTION

The present invention relates to materials for reversible hydrogen storage and in particular to nonequilibrium state rare earth-transition metal materials for such application.

BACKGROUND OF THE INVENTION

The high density storage of hydrogen as a fuel for controlled release and combustion with oxygen to provide energy is of current interest. Conventional high pressure storage in the compressed gas or liquidized state is undesirable because of the high pressure involved, the bulk weight of the containers, and inherent danger in pressurized systems. Other techniques for hydrogen storage have included the utilization of material having the chemical binding capability for reversibly storing, and therefore releasing, hydrogen gas at relatively low temperatures and pressures. A number of materials have evolved for this purpose including certain rare earth-transition materials and in particular samarium-cobalt, $SmCo_5$ and lanthanum-nickel, $LaNi_5$. One of the serious limitations in the previous use of samarium-cobalt and similar materials is their structural instability over repeated absorption/desorption cycles of hydrogen storage and release.

Samarium-cobalt and similar rare earth-transition metal materials have a crystalline atomic structure characterized by a systematized arrangement of atoms within a lattice structure which differs from material type to material type. Recent investigations point to the existence of crystal structure strains resulting from repeated absorption and desorption of hydrogen gas as being at least partially responsible for the fracturing of the hydrogen storage material under such repeated cycling.

The results of such fracturing impair the use of the material in a hydrogen storage cell. In the case where such material is used as a plurality of exposed sheet surfaces in a labyrinth of passages through which hydrogen is pumped, the fracturing would clearly destroy the physical and mechanical integrity of the cell. In other cases in which a fluidized bed of particulate material is employed, the particle size is important to proper aeration of the fluidized bed whereas repeated fracturing results in particles of such small size that they pack in dense clumps which can not be effectively fluidized thereby greatly reducing the effective storage capacity of the cell.

BRIEF SUMMARY OF THE INVENTION

In accordance with the teaching of the present invention, samarium-cobalt, lanthanum-nickel and other rare earth-transition metal materials as well as other alloys useful for reversible hydrogen storage are produced in a nonequilibrium structural state such as an amorphous or metastable crystalline state. The nonequilibrium state materials are used as a hydrogen absorbing material in a cell for the reversible storage of hydrogen gas which in turn serves as an energy generating fuel supply. The nonequilibrium state material eliminates the tendency to fracture characteristic of crystalline state rare earth-transition metal materials and possesses an enhanced hydrogen storage capacity for the same bulk of material.

Samarium-cobalt, lanthanum-nickel and other rare earth-transition metal materials when cooled from a high temperature, liquid state assume a crystallized state of a predetermined atomic lattice nature dependent upon the material involved and characteristic of the low or room temperature phase of the material. The avoidance of a crystallization transformation from the liquid state as the rare earth-transition metal material is cooled can not be achieved by normal techniques insofar as it requires rapid cooling rates. Rates are required substantially in excess of $10^4$ degrees centigrade per second, typically in the range of $10^6$ to $10^8$ degrees centigrade per second. When special steps are taken to produce such rapid cooling, the transformation to the low temperature crystalline phase is suppressed to produce either a completely amorphous, solid state, rare earth-transition metal material characterized by the random atomic structure of the liquid state from which cooling commences or to a partially crystallized or metastable crystalline state depending upon the specific cooling rate utilized. Samarium-cobalt and lanthanum-nickel materials thus produced are configured into a form in which they are then used for hydrogen storage with the improved storage capacity and fracture immunity necessary to make a commercially successful fuel storage cell.

BRIEF DESCRIPTION OF THE DRAWING

These and other features of the present invention are more fully set forth below in the following detailed description and accompanying drawing of which:

FIG. 1 is a schematic diagram of apparatus useful in producing nonequilibrium state rare earth-transition materials for use as hydrogen storage media in accordance with the present invention;

FIG. 2 illustrates the process of nonequilibrium state material formation for use in accordance with the present invention;

FIG. 3 is a schematic diagram of first reversible hydrogen storage apparatus for use in the present invention;

FIG. 4 is a schematic diagram of second apparatus for use in providing reversible hydrogen storage in accordance with the present invention.

DETAILED DESCRIPTION

The present invention contemplates a nonequilibrium state material, particularly a rare earth-transition metal material such as a rare earth-cobalt or a rare-nickel alloy like samarium-cobalt and lanthanum-nickel for use in reversible hydrogen storage in a hydrogen fuel cell. Other crystalline materials, such as iron-titanium alloys, previously used for hydrogen storage in the crystalline state, may also be provided in a nonequilibrium state and used thus more advantageously for reversible hydrogen storage.

Materials such as the alloys of a rare earth and transition metal and certain other alloys have long been known for having a capacity to reversibly store, and therefore release, a substantial amount of hydrogen at relatively low pressures and temperatures. U.S. Pat. Nos. 4,036,944 and 4,133,426 show representative examples of this technology. In particular the U.S. Pat. No. 4,036,944 recognizes the well known deficiency of such materials in that they tend to fracture after repeated cycles of storage and release of hydrogen gas, eventually reducing the effectiveness of the cell as a storage mechanism to the point of uselessness. Such a deficiency is a serious limitation in the commercial or industrial application of such hydrogen storage cells. Recent investigations of rare earth-metal alloys has led to the discovery that the production of the alloy in an amorphous state, characterized by a random atomic orientation, as opposed to the regular lattice structure of the crystalline state, produces a material capable of absorbing substantially larger quantities of hydrogen without any tendency to fracture over repeated absorption/desorption cycles.

The production of nonequilibrium state rare earth-transition metal materials requires that the normal transformation to a room temperature crystal phase material be suppressed. This typically involves cooling the material from a liquid state in a very rapid manner, above $10^4$ degrees centigrade per second, typically within the range of $10^6$ to $10^8$ degrees centigrade per second in the case of samarium-cobalt. Such rapid quenching can not readily be achieved without the use of special techniques. One such technique is illustrated with respect to FIG. 1 showing an apparatus for plasma spraying a earth-transition metal powder. It is to be noted that FIG. 1 represents an exemplary approach to producing the amorphous material for use in the present invention, other techniques being possible. In the apparatus of FIG. 1 the sprayed powder is converted into a liquid by a plasma torch and directed at a cooled substrate which accomodates the required rapid cooling to a solid, nonequilibrium state material. In particular, in FIG. 1 a plasma torch 12 has a gas supply annular passage 14 surrouding a central electrode 16 and contained within an outer housing 18 acting as an electrode. The gas applied through the annular passage 14 exits through a gas nozzle 20 directly above which is a material feed nozzle 22 that applies a rare earth-transition metal powder through a channel 24 to the gas from the gas nozzle 20. The combined gas and rare earth-transition metal material is directed toward a cooled substrate 26 for deposition in a nonequilibrium, amorphous or metastable crystalline phase.

Liquification of the powdered, rare earth-transition metal material is achieved by heating and ionizing the gas supplied through the annular channel 14 by an arc discharge 28 between the electrode 16 and the surrounding housing electrode 18. Passage through the nozzle 20 permits the gas to be accelerated toward the substrate 26. The powdered, rare earth-transition metal material injected through the nozzle 22 is picked up by the plasma gas and uniformly liquified and homogenized in temperature to form a plasma flame 34 directed at deposition layer 32 on the substrate 26 where the liquified rare earth-transition metal material collects for instant cooling. This rapid cooling avoids the transition to a crystallized state characteristic of low temperature rare earth-transition metal alloys.

The substrate 26 may be mounted on a shaft 30 for rotation during the deposition of the layer 32 to improve the homogeneity of the deposit. A use of a particle size of substantial uniformity is desirable along with relatively short nozzle 20 to substrate 26 distances in the range of 2 to 20 centimeters. This insures a homogeneous liquified condition to the deposited material as it strikes the layer 32. A particle size of 40 microns plus or minus 20 microns is typical in the case of samarium-cobalt either as $SmCo_5$ or $Sm_2Co_{17}$.

The substrate 26 is preferably of a high thermal conductivity material such as copper and the rotation rate, where employed, is preferably a few hundred revolutions per minute. In addition, a scanning mechanism 36 may be utilized to oscillate substrate 26 in amplitudes that increase with thickness of layer 32 thereby insuring more uniform cooling by reducing the deposition rate with increasing deposit thickness and therefore with increasing thermal resistance between the hot deposition and the cool sink of the substrate 26. The substrate 26, typically using a water cooling circulation, is maintained well below the crystallization temperature for the rare earth-transition metal material. The crystallization temperature is approximately 500 degress centigrade in the case of samarium-cobalt. The deposition apparatus of FIG. 1 is substantially as shown in copending, commonly assigned U.S. patent application Ser. No. 138,650, filed Apr. 8, 1980.

FIG. 2 illustrates the typical process of nonequilibrium state rare earth-transition metal material formation for use in the present invention and in essence requires the material start in a liquid state as illustrated in step 38 and experience a rapid cooling well in excess of $10^4$ degrees centrigrade per second in a cooling step 40 to result in a nonequilibrium solid formation step 42 which is completely stable not only chemically but physically after repeated cycles of hydrogen absorption and release. The cooling step 40 typically occurs at a rate of $10^6$ to $10^8$ degrees centrigrade per second in the case of samarium-cobalt. The more rapid rate produces a totally amorphous state material from complete suppression of the transformation to the low temperature crystalline phase. A partially crystallized or metastable crystalline state in which some crystalline forms, occurs from a less rapid cooling in step 40. The metastable condition nevertheless lacks the overall crystallized condition which leads to fracturing from the stresses of repeated cycles of hydrogen storage and release.

A first cell for the reversible storage of hydrogen using nonequilibrium state material such as provided above is illustrated with respect to FIG. 3. As shown there a container 44 includes a plurality of plates 46 emanating from opposite inner walls of the container 44 in an interlocking comb pattern to define a elongated or labyrinth set of passages 48 through the container 44. The plates 46 contain deposits of nonequilibrium state material, the rare earth-transition metal material formed above as deposits 32. These are formed in sheets of up to 5 mm thickness and typically backed by a substrate on which the deposit 32 forms to provide mechanical structure to the plates 46. Hydrogen gas is typically cycled through the channels 48 by a pump 50, forming a closed loop through conduits 52 and 54, inlet 56 and outlet 58. A hydrogen supply or extraction conduit 60 is provided to apply hydrogen to the storage cell for absorption by the rare earth-transition metal material on the plates 46 or for release therefrom.

FIG. 4 illustrates a second, alternative cell for reversibly storing hydrogen in nonequilibrium state in accordance with the present invention and includes a fluidized bed chamber 62 having therein a supply of powdered, nonequilibrium state rare earth-transition metal material typically produced in accordance with the apparatus and process illustrated above and and subsequently ground to a desired particle size as known in the art. A pump 66 is provided which, by means of conduits 68 and inlet 70 and outlet 72, applies a stream of hydrogen gas through the fluidized bed 64, typically after distribution through a collimation apparatus 74. Supply and exhaust conduit 76 is similarly provided so that the hydrogen can be applied to or retrieved from the storage chamber 62. Apparatus using crystalline state material for providing fluidized bed storage and release of hydrogen material of the type illustrated in FIG. 4 are known in the art. The cells of both FIGS. 3 and 4 are typically operated at several atmospheres of pressure.

The above described invention provides for an efficient and effective reversible hydrogen storage cell with improved hydrogen storage capacity and material fracture immunity. Alterations and improvements to the specific example illustrated above are contemplated within the scope of the invention as only limited in the following claims.

What is claimed is:

1. A system for retrievably storing hydrogen comprising:
   an amorphous rare earth-transition metal alloy material;
   a container for said material, and
   means for supplying hydrogen to said material and exhausting hydrogen from said material for respective absorption and desorption thereby.

2. The system of claim 1, wherein said amorphous rare earth-transition metal alloy material is selected from the group consisting of rare earth-cobalt alloys, rare earth-nickel alloys, and combinations thereof.

3. The system of claim 1, wherein said amorphous rare earth-transition metal alloy material is selected from the group consisting of samarium-cobalt, lanthanum-nickel, and combinations thereof.

4. The system of claim 1, wherein said amorphous rare earth-transition metal alloy material is in the form of a plurality of sheets within said container.

5. The system of claim 1, wherein:
   said amorphous rare earth-transition metal alloy material is in a particulate form within said container; and
   said container further comprises fluidized bed apparatus.

6. A process for reversibly storing hydrogen in an amorphous rare earth-transition metal alloy material comprising the steps of:
   supplying hydrogen to amorphous rare earth-transition metal alloy material in a closed system, cycling said hydrogen over said alloy material to cause hydrogen to be stored in said alloy material; and
   withdrawing hydrogen from said system to retrieve the stored hydrogen.

7. The process of claim 6, wherein said rare earth-transition metal alloy material is selected from the group consisting of rare earth-cobalt alloys, rare earth-nickel alloys, and combinations thereof.

8. The process of claim 6 wherein said rare earth-transition metal alloy material is selected from the group consisting of samarium-cobalt, lanthanum-nickel and combinations thereof.

* * * * *